(12) United States Patent
Takeuchi

(10) Patent No.: US 8,264,922 B2
(45) Date of Patent: Sep. 11, 2012

(54) OPTICAL DISC DRIVE HAVING A MECHANISM TO REDUCE THE NOISE LEVEL OF A FOCUS ERROR SIGNAL

(75) Inventor: Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 512 days.

(21) Appl. No.: 11/696,910

(22) Filed: Apr. 5, 2007

(65) Prior Publication Data

US 2007/0237039 A1 Oct. 11, 2007

(30) Foreign Application Priority Data

Apr. 10, 2006 (JP) ................................ 2006-107096

(51) Int. Cl.
*G11B 7/00* (2006.01)
*G11B 7/125* (2006.01)
(52) U.S. Cl. ............. 369/44.23; 369/44.37; 369/112.01; 369/112.05
(58) Field of Classification Search ............... 369/44.24; G02B 27/58
See application file for complete search history.

(56) References Cited

U.S. PATENT DOCUMENTS

| | | | | |
|---|---|---|---|---|
| 3,705,758 A * | 12/1972 | Haskal | ........................... | 359/239 |
| 3,787,888 A * | 1/1974 | Haskal | ........................... | 347/246 |
| 5,121,378 A * | 6/1992 | Hirose et al. | ............. | 369/112.28 |
| 5,311,495 A * | 5/1994 | Ando | ....................... | 369/112.28 |
| 5,329,517 A * | 7/1994 | Yamaguchi et al. | ........ | 369/13.29 |
| 5,581,531 A * | 12/1996 | Ito et al. | ......................... | 369/100 |
| 5,724,334 A * | 3/1998 | Ohba et al. | ................ | 369/112.16 |
| 5,754,512 A * | 5/1998 | Komma et al. | .......... | 369/112.08 |
| 5,901,131 A * | 5/1999 | Ootaki et al. | ............. | 369/112.02 |
| 6,353,587 B1 * | 3/2002 | Hong et al. | ............... | 369/112.15 |
| 6,469,838 B2 * | 10/2002 | Tawa et al. | ...................... | 359/668 |
| 6,605,396 B2 * | 8/2003 | Schroeder et al. | ................ | 430/5 |
| 6,688,758 B2 * | 2/2004 | Thibault | ....................... | 362/368 |
| 6,930,962 B2 * | 8/2005 | Kitamura et al. | .......... | 369/44.23 |
| 7,035,193 B2 | 4/2006 | Takeuchi et al. | | |
| 7,035,196 B2 * | 4/2006 | Takasuka et al. | ............. | 369/121 |
| 7,142,484 B2 * | 11/2006 | Ando et al. | ................ | 369/44.23 |
| 2002/0060958 A1 * | 5/2002 | Ando et al. | ................ | 369/44.23 |
| 2003/0080274 A1 * | 5/2003 | Izumi et al. | ................ | 250/201.5 |
| 2004/0032815 A1 * | 2/2004 | Kim et al. | ................ | 369/112.26 |

(Continued)

FOREIGN PATENT DOCUMENTS

EP 532175 A1 * 3/1993

(Continued)

*Primary Examiner* — Hoa T Nguyen
*Assistant Examiner* — Mark Fischer
(74) *Attorney, Agent, or Firm* — Greenblum & Bernstein, P.L.C.

(57) ABSTRACT

There is provided an optical disc drive, which includes a light source emitting a light beam, a beam dividing element that divides the light beam into main and sub-beams, an objective lens, an astigmatism producing unit that gives astigmatism to the main and sub-beams, a signal generation unit that has sensors for the beams and generates a focus error signal based on output signals of the sensors; and an optical element that has a function of adjusting intensity distribution of the main beam such that the main beam incident on the optical disc has a predetermined intensity distribution where a maximum intensity level is positioned at a predetermined height within a range of 70% of a pupil diameter, the predetermined height is not equal to an optical axis, and an intensity of the main beam decreases gradually from the predetermined height to a peripheral portion of the pupil.

20 Claims, 3 Drawing Sheets

U.S. PATENT DOCUMENTS

| | | |
|---|---|---|
| 2004/0037204 A1 | 2/2004 | Takeuchi |
| 2005/0135208 A1 | 6/2005 | Takeuchi |
| 2005/0157623 A1 | 7/2005 | Itonaga |
| 2005/0254397 A1* | 11/2005 | Arai et al. ............ 369/112.01 |
| 2007/0014211 A1 | 1/2007 | Koreeda et al. |
| 2007/0070860 A1 | 3/2007 | Koreeda et al. |
| 2008/0031106 A1* | 2/2008 | Terashima et al. ......... 369/44.41 |

FOREIGN PATENT DOCUMENTS

| | | | |
|---|---|---|---|
| JP | 06215408 A | * | 8/1994 |
| JP | 2005-203043 | | 7/2005 |
| JP | 2006024268 A | * | 1/2006 |

* cited by examiner

OPTICAL DISC DRIVE HAVING A MECHANISM TO REDUCE THE NOISE LEVEL OF A FOCUS ERROR SIGNAL

BACKGROUND OF THE INVENTION

The present invention relates to an optical disc drive for recording data to and/or reproducing data from an optical disc.

Recently, optical discs having a higher recording density have been proposed. One of such optical discs is a DVD (digital versatile disc). The technical standard for the DVD is divided into some subgroups including standards for a DVD-ROM dedicated to reproduction of information, a DVD±R supporting one-time recording, a DVD-RAM supporting multiple recordings, and a DVD-RW. Since, in general, structures for recordation of information vary among the subgroups even if the subgroups belong to a common technical standard, it is required to generate servo signals suitably matching a structure (i.e., a subgroup) of an optical disc being used so that recording and reproducing operation can be properly performed.

Frequently, an astigmatic method is employed in an optical disc drive to generate a focus error signal which is one of the servo signals. According to the astigmatic method, astigmatism is added to light returning from an optical disc, and then the returning light is incident on a sensor having four separate sensor segments. In the sensor, the focus error signal is generated based on a difference between sum of output signals of a pair of diagonally arranged sensor segments and sum of output signals of the other pair of diagonally arranged sensor segments.

If the astigmatic method is used for an optical disc having a land/groove structure on a recording surface thereof, a possibility that a proper focus error signal is not generated arises. That is because there is a possibility that, when a beam spot from which the focus error signal is generated passes the land/groove structure in accordance with tracking movement of an objective lens, the output signals of the sensor segments are badly affected. Consequently, the focus error signal may be badly affected and thereby precise servo control may be disrupted.

Japanese Patent Provisional Publication No. 2005-203043A (hereafter, referred to as JP 2005-203043A) discloses an optical disc drive configured to solve the above mention drawback of the astigmatic method. In the optical disc drive disclosed in JP 2005-203043A, a main beam and two sub-beams are generated for servo control, and the main beam is used for generation of a focus error signal in addition to using the two sub-beams for generation of the focus error signal. In the optical disc drive, the main and sub-beams are arranged such that positions of beam spots of the two sub-beams on the recording surface of the optical disc shift in a radial direction (i.e., to the inside and the outside of the optical disc) and in a circumferential direction of the optical disc with respect to the beam spot of the main beam.

According to the configuration of the optical disc drive disclosed in JP 2005-203043A, phases of fluctuations caused on the two sub-beams when the two sub-beams are reflected by the recording surface have an inverse relationship. Therefore, by combining the signals obtained from the two sub-beams (or by combining the signals from the main and two sub-beams), a suitable focus error signal can be obtained. Frequently, such a technique for generating a suitable focus error signal is called a differential astigmatic method.

In the optical disc drive disclosed in JP 2005-203043A, the interval between a beam spot of the main beam and a beam spot of each sub-beam is extremely small. Therefore, a sensor for receiving the main beam and a sensor for receiving each sub-beam have to be closely located with respect to each other. Therefore, if defocus is caused, a part of a blurred beam spot of the main beam may undesirably enter one of the sensors for the sub-beams. In general, the sensor for the sub-beam is adjusted to have a high gain because the intensity of the sub-beam is smaller than that of the main beam. Therefore, even a part of the blurred main beam may be detected by the sensor for the sub-beam as a relatively large noise.

It is understood that a level of such a noise caused by a part of a blurred main beam entering the sensor for the sub-beam can be decreased by increasing the intensity of the sub-beam. However, to increase the intensity of the sub-beam, it is required to decrease the intensity of the main beam because the main and sub beams are produced in the optical disc drive by splitting a single laser beam emitted from a single light source through use of a diffraction element. Decreasing of the intensity of the main beam may raise other problems such as decrease of a level of an RF signal and deterioration of a property of fast recording.

It is understood that a level of such a noise caused by a part of a blurred main beam entering the sensor for the sub-beam can be decreased by increasing the interval between the sensor for the main beam and the sensor for each sub-beam. However, if the interval between the sensor for the main beam and the sensor for the sub-beam is increased, the interval between the beam spot of the main beam and the beam spot of the sub-beam increases accordingly. In this case, an effective angle of view of an objective lens has to be increased. If the objective lens has a relatively large effective angle of view, unexpected aberrations may be caused. For this reason, increasing of the interval between the beam spot of the main beam and the beam spot of the sub-beam is inappropriate.

SUMMARY OF THE INVENTION

The present invention is advantageous in that it provides an optical disc drive capable of generating a suitable focus error signal while suppressing a noise level caused on the focus error signal due to occurrence of defocusing.

According to an aspect of the invention, there is provided an optical disc drive, which is provided with a light source that emits a light beam, a beam dividing element that divides the light beam emitted by the light source into a main beam and a plurality of sub-beams such that each of the plurality of sub-beams has a light amount smaller than that of the main beam, an objective lens that converges each of the main beam and the plurality of sub-beams onto a recording surface of an optical disc; and an astigmatism producing unit that gives astigmatism to each of the main beam and the plurality of sub-beams which passed through the objective lens after reflecting from the recording surface of the optical disc. The optical disc drive is further provided with a signal generation unit that has sensors respectively provided for receiving the main beam and at least two of the plurality of sub-beams which passed through the astigmatism producing unit, and generates a focus error signal based on output signals of the sensors; and an optical element that has a function of adjusting intensity distribution of the main beam incident on the optical disc such that the main beam incident on the optical disc has a predetermined intensity distribution where a maximum intensity level is positioned at a predetermined height within a range of 70% of a pupil diameter, the predetermined height is not equal to an optical axis, and an intensity of the main beam decreases gradually from the predetermined height to a peripheral portion of the pupil.

With this configuration, even if the main beam is not sufficiently converged in the vicinity of a sensor for the main beam due to occurrence of defocus and thereby a part of the main beam enters at least one sensor for a sub-beam, it is possible to sufficiently reduce a possibility that a noise is caused on the focus error signal.

In at least one aspect, the predetermined height is positioned within a range of 50% of the pupil diameter.

In at least one aspect, predetermined height is positioned outside a range of 20% of the pupil diameter.

In at least one aspect, the main beam has an intensity distribution equal to Gaussian distribution after reflected from the recording surface of the optical disc.

In at least one aspect, the optical element includes a coating having the function of providing the predetermined intensity distribution to an incident beam and is provided on a surface of the objective lens.

In at least one aspect, the optical element includes a diffraction structure having the function of providing the predetermined intensity distribution to an incident beam and is provided on a surface of the objective lens.

In at least one aspect, each of the sensors has four sensor segments, and the signal generation unit generates the focus error signal in accordance with an astigmatic method.

In at least one aspect, the signal generation unit generates an RF signal based on an output signal of one of the sensors for the main beam.

In at least one aspect, the signal generation unit generates the focus error signal based on output signals of at least two of the sensors provided for the plurality of sub-beams.

In at least one aspect, the signal generation unit generates the focus error signal further based on an output signal of one of the sensors for the main beam.

In at least one aspect, the signal generation unit generates the focus error signal based on output signals of at least two of the sensors for main beam and the plurality of sub-beams.

BRIEF DESCRIPTION OF THE ACCOMPANYING DRAWINGS

DETAILED DESCRIPTION OF THE EMBODIMENTS

Hereinafter, an embodiment according to the invention is described with reference to the accompanying drawings. In this specification, the term "optical disc drive" includes an optical disc drive designed specifically for recording information to an optical disc, an optical disc drive specifically designed for reproducing information from an optical disc, and an optical disc drive having both of functions of recording information to and reproducing information from an optical disc.

Figure 1:
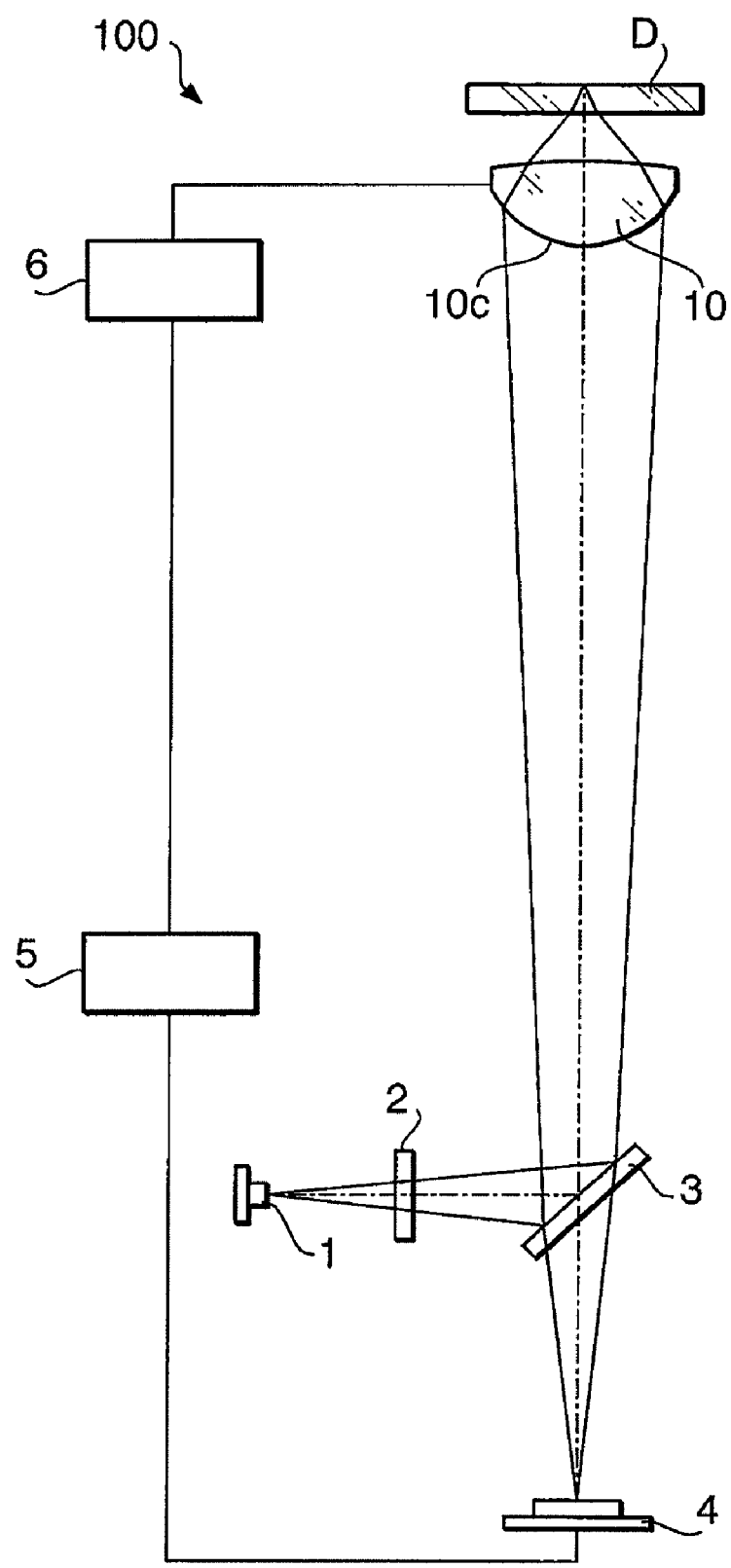
FIG. 1 is a block diagram of an optical disc drive according to the embodiment.

FIG. 1 is a block diagram of an optical disc drive 100 according to the embodiment. FIG. 1 illustrates a general configuration of the optical disc drive 100 in which an optical disc D is placed, for example, on a turn table. As shown in FIG. 1, the optical disc drive 100 includes a light source 1, a diffraction element 2, a half mirror 3, a photoreceptor 4, a signal generation unit 5, a lens driving unit 6, and an objective lens 10. The optical disc D is rotated on the turn table by a driving unit (not shown). When the optical disc D is rotated, the light source 1 is activated to emit a laser beam for recording information to and/or producing information from the optical disc D. The laser beam (diverging beam) emitted by the light source 1 is incident on the diffraction element 2, is reflected by the half mirror 3, and then is incident on the objective lens 10.

The diffraction element 2 divides the incident beam into three beams by the diffraction effect. The three beams include a main beam and two sub-beams. The main beam has a light amount larger than those of the sub-beams, and is used for recording and reproducing operations for the optical disc D. That is, the main beam contributes to formation of an RF signal. The diffraction element 2 divides the laser beam from the light source 1 so that the three beams are aligned in a line with the main beam being positioned between the two sub-beams. Since an actual interval between adjacent ones of the three beams is small, in FIG. 1 only the main beam is illustrated for the purpose of simplicity.

The beam passed through the objective lens 10 converges onto a recording surface of the optical disc D, and then reflects from the recording surface. The beam returning from the optical disc D is incident on the objective lens 10 again, and then passes through the half mirror 3. The half mirror 3 has a function of giving astigmatism to the beam (i.e., each of the three beams) passing therethrough. The beam passed through the half mirror 3 is then incident on the photoreceptor 4.

Figure 2:
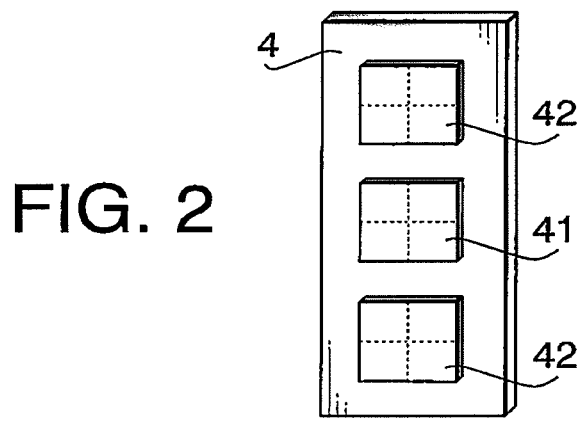
FIG. 2 illustrates a configuration of a photoreceptor provided in the optical disc drive.

FIG. 2 illustrates a configuration of the photoreceptor 4. As shown in FIG. 2, the photoreceptor 4 includes a sensor 41 for the main beam and sensors 42 and 42 for the sub-beams arranged in a line correspondingly to the arrangement of the three beams. Each of the sensors 41 and 42 has four sensor segments separated by a cross-shape separation line. The main beam passed through the half mirror 3 is incident on the sensor 41, and the sub-beams passed through the half mirror 3 are incident on the sensors 42 and 42, respectively.

The sensor 41 generates a signal having an amplitude corresponding to the light amount of the main beam being incident thereon. In the optical disc drive 100, the RF signal is generated based on the signal outputted by the sensor 41. Each of the sensors 42 and 42 generates a signal having an amplitude corresponding to the light amount of the sub-beam incident thereon. The signals outputted by the sensors 42 and 42 are inputted to the signal generation unit 5.

Each of the sensors 41 and 42 outputs a signal (hereafter, referred to as a first diagonal sum signal) representing a sum of output levels of a pair of sensor segments arranged diagonally therein and a signal (hereafter, referred to as a second diagonal sum signal) representing a sum of output levels of the other pair of sensor segments arranged diagonally therein. The signal generation unit 5 receives these signals from each of the sensors 41 and 42. The signal generation unit 5 generates a focus error signal by calculating a difference between the output levels of the first and second diagonal sum signals outputted by each of the sensors 41 and 42. More specifically, the signal generation unit 5 may combine the first diagonal sum signals of the sensor 41 and 42 together, combines the second diagonal sum signals of the sensors 41 and 42 together, and then generates the focus error signal by calculating the difference between the combined first diagonal sum signal and the combined second diagonal sum signal.

The lens driving unit 6 performs a focusing operation by moving the objective lens 10 in a direction of an optical axis of the objective lens 10 in accordance with the focus error signal provided by the signal generation unit 5. If defocus arises in the optical disc drive 100, the main beam is not converged sufficiently in the vicinity of the sensor 41. In this case, a possibility that the blurred main beam is detected by each of the sensors 42 arises.

Since the light amount of each of the sub-beams is smaller than that of the main beam, the first and second diagonal sum signals obtained from the sub-beams are amplified to have a predetermined level. Therefore, if a part of the main beam having the larger light amount than the sub-beam enters the sensor 42, the output signals (i.e., the first and second diagonal sum signals) of the sensor 42 may be badly affected by the part of the main beam entering the sensor 42. That is, the part of the main beam may cause a noise on the output signals of the sensor 42. As a result, a noise may appear on the focus error signal generated by the signal generation unit 5. In this case, a proper focusing operation can not be expected.

To prevent occurrence of such a problem, the optical disc drive 100 is configured to adjust the intensity distribution of the main beam entering the sensor 41 through the objective lens 10 so that a suitable focusing error signal enabling the optical disc drive 100 to perform a precise focusing operation can be generated. The adjustment of the intensity distribution of the main beam is attained, for example, by adjusting the transmissivity distribution of one of the optical components located between the light source 1 and the objective lens 10 along an optical path or by adjusting the function of a diffraction structure formed on a lens surface of the objective lens 10.

That is, the adjustment of the intensity distribution can be achieved in various ways. For example, the intensity distribution may be adjusted by coating 10c formed on a front surface of the objective lens 10. The adjustment of the intensity distribution of the main beam may be implemented by the combination of the adjustment of the transmissivity distribution of one of the optical components in the optical disc drive 100 and the adjustment of the diffraction structure formed on at least one of front and rear surfaces of the objective lens 10.

In this embodiment, the intensity distribution of the main beam is adjusted by forming coating for controlling the transmissivity on a lens surface of the objective lens 10 and by adjusting the diffraction efficiency of the diffraction structure of the objective lens 10.

Figure 3:
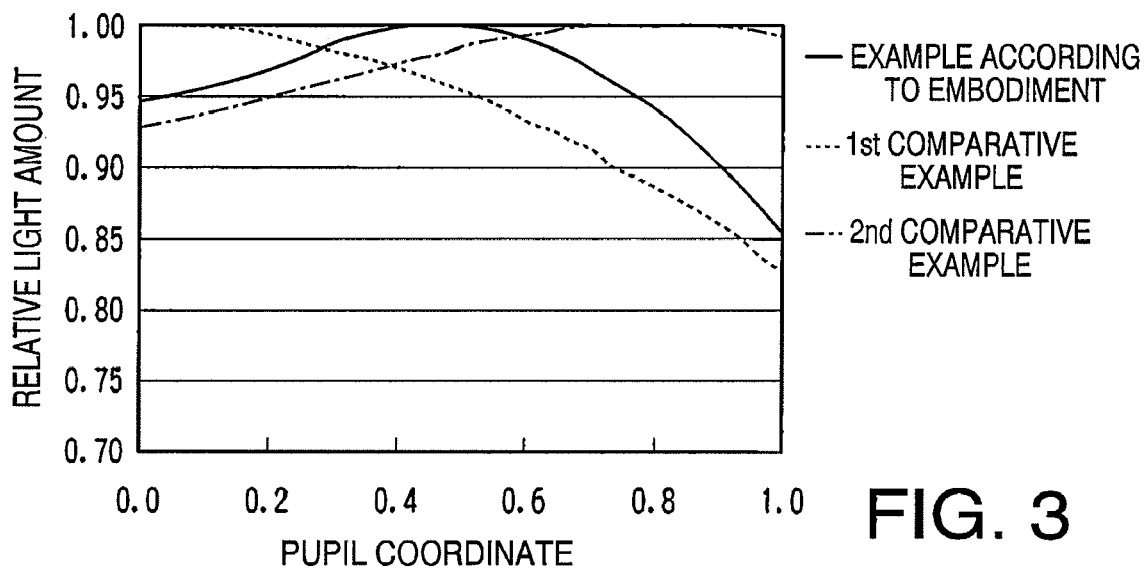
FIG. 3 is a graph illustrating an example of intensity distribution of a main beam converging on a recording surface of an optical disc after passing through an objective lens.

FIG. 3 is a graph illustrating an example of intensity distribution of the main beam converging on the recording surface of the optical disc D after passing through the objective lens 10. In FIG. 3, a horizontal axis is a pupil coordinate representing a relative coordinate defined with respect to the maximum pupil position, and a vertical axis represents a relative light amount defined with respect to the maximum light amount. In FIG. 3, a curve indicated by a solid line represents the example of intensity distribution of the main beam according to the embodiment.

For explaining the advantages of the intensity distribution according to the embodiment, intensity distributions of two comparative examples ($1^{st}$ and $2^{nd}$ comparative examples) are illustrated in FIG. 3. In FIG. 3, a curve indicated by a dashed line represents intensity distribution of a main beam in an optical disc drive according the $1^{st}$ comparative example, and a curve indicated by a chain line represents intensity distribution of a main beam in an optical disc drive according a $2^{nd}$ comparative example. That is, the optical disc drive according to the $1^{st}$ comparative example has substantially the same configuration as that of the optical disc drive 100, but the intensity distribution of the main beam of the $1^{st}$ comparative example is adjusted as shown by the curve indicated by the dashed line in FIG. 3. The optical disc drive according to the $2^{nd}$ comparative example has substantially the same configuration as that of the optical disc drive 100, but the intensity distribution of the main beam of the $2^{nd}$ comparative example is adjusted as shown by the curve indicated by the chain line in FIG. 3.

Regarding the optical disc drive 100, the intensity distribution has the maximum level at the pupil position of 0.47, and the intensity gradually decreases from the maximum level position 0.47 to the peripheral portion and to the pupil center. In other words, according to the embodiment, the intensity distribution is adjusted such that the maximum level position falls within the pupil diameter range of 20% to 50%.

Regarding the $1^{st}$ comparative example, the intensity distribution of the main beam has the maximum level at the pupil center. Regarding the $2^{nd}$ comparative example, the intensity distribution of the main beam is adjusted such that the intensity takes the maximum level at the pupil position of 0.80.

Figure 4:
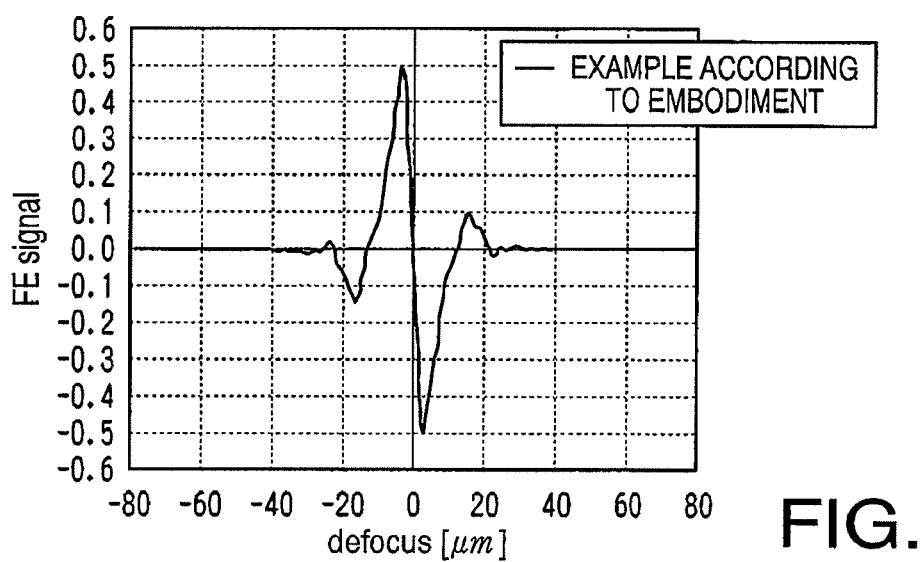
FIG. 4 shows a focus error signal generated in the optical disc drive according to the embodiment.
Figure 5:
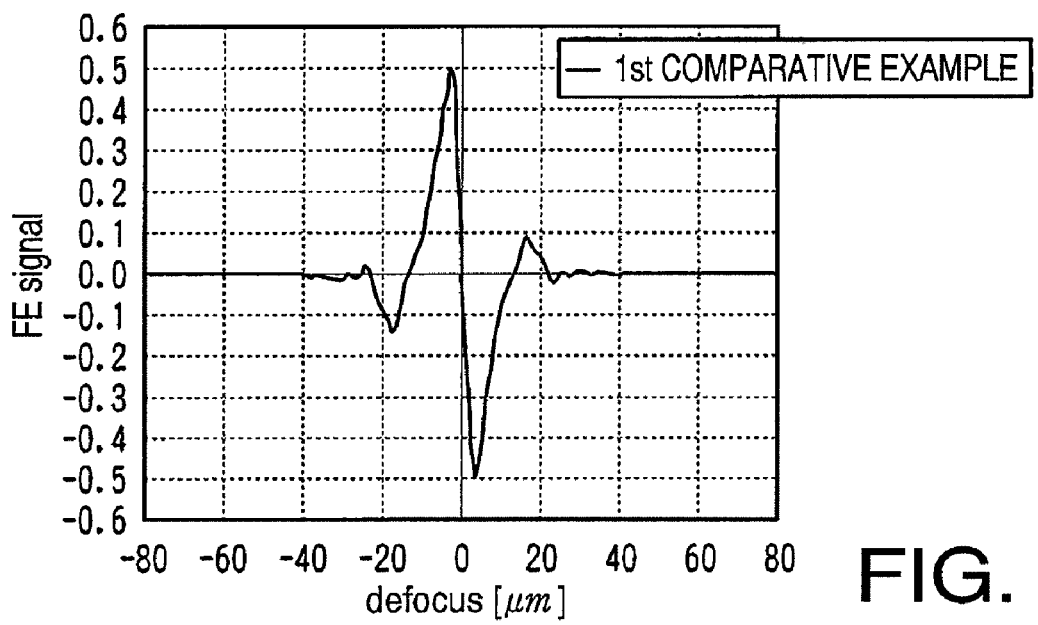
FIG. 5 shows a focus error signal generated in an optical disc drive according to a $1^{st}$ comparative example.
Figure 6:
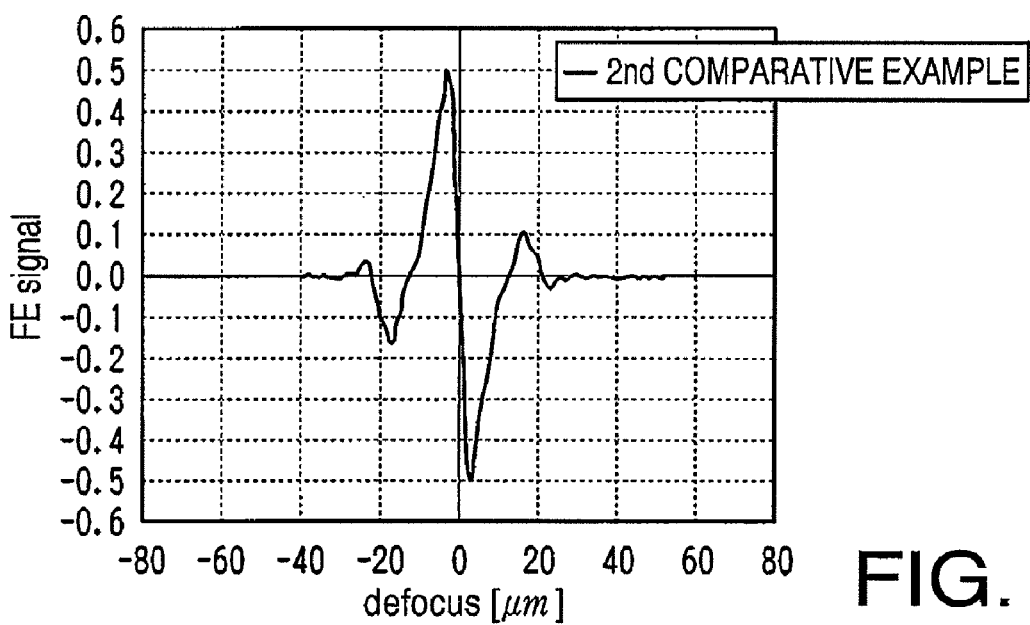
FIG. 6 shows a focus error signal generated in an optical disc drive according to a $2^{nd}$ comparative example.

FIG. 4 shows a focus error signal generated in the optical disc drive 100 according to the embodiment when the gain of each sensor 42 is adjusted to 10. FIG. 5 shows a focus error signal generated in the optical disc drive according to the $1^{st}$ comparative example when the gain of each sensor 42 is adjusted to 10. FIG. 6 shows a focus error signal generated in the optical disc drive according to the $2^{nd}$ comparative example when the gain of each sensor 42 is adjusted to 10.

As can be seen from the comparison between FIGS. 4, 5 and 6, although a S-curve part of the focus error signal shown in each of FIGS. 4, 5 and 6 has a noise at both end portions of the S-curve part, the noise levels of the focus error signal of each of FIGS. 4 and 5 (i.e., the focus error signal according to the embodiment and the $1^{st}$ comparative example) are relatively small. By contrast, the noise level of the focus error signal according to the $2^{nd}$ comparative example is relatively large. In other words, by adjusting the intensity distribution of the main beam such that the intensity gradually decreases to the peripheral portion of the pupil, it is possible to effectively suppress the noise level even if the focus error signal is generated through use of two or more of the three beams.

Assuming that the laser beam emitted by the light source 1 has a uniform intensity distribution and the total light amount of the main beam before the adjustment of the intensity distribution is 100%, the total light amount of the main beam after the adjustment of the intensity distribution according to the embodiment is 95.2%, the total light amount of the main beam after the adjustment of the intensity distribution according to the $1^{st}$ comparative example is 91.1%, and the total light amount of the main beam after the adjustment of the intensity distribution according to the 2nd comparative example is 98.8%.

Regarding the $1^{st}$ comparative example, loss of the light amount is considerably large. Therefore, the $1^{st}$ comparative example is not able to effectively use the light amount of the main beam although the $1^{st}$ comparative example is able to generate a relatively suitable focus error signal. In addition, in the $1^{st}$ comparative example, the light amount in the peripheral portion is smaller than that in the central portion of the pupil. Therefore, in the $1^{st}$ comparative example, an effective NA (numerical aperture) becomes small and thereby a necessary diameter of the beam spot can not be obtained.

By contrast, according to the embodiment, loss of the light amount of the main beam is suppressed to a level a little less than a loss of 5%. Further, according to the embodiment, a difference between the light amount of the main beam in the peripheral portion and the light amount of the main beam in the central portion of the pupil is suppressed to a sufficiently low level. Therefore, according to the embodiment, it is possible to generate a suitable focus error signal while securing a sufficient light amount and a beam diameter suitable for performing precise recording and reproducing operations.

There is a possibility that, when defocus arises, a part of the not converged sub-beam enters the sensor 41 for the main beam. Even if such a phenomenon arises, the light amount of the part of the sub-beam received by the sensor 41 is extremely smaller than the light amount of the main beam received by the sensor 41. Therefore, even if the part of the sub-beam received by the sensor 41 appears on a diagonal sum signal representing a sum of output levels of a pair of sensor segments arranged diagonally in the sensor 41. Such a noise level caused by the sub-beam is extremely small. Therefore, the optical disc drive 100 does not necessarily require the adjustment of the intensity distribution of the sub-beam. However, by including the sub-beams as targets of the adjustment of the intensity distribution, a configuration for the adjustment of the intensity distribution can be simplified.

Although the present invention has been described in considerable detail with reference to certain preferred embodiments thereof, other embodiments are possible.

In the above mentioned embodiment, the intensity distribution is adjusted such that the point of the maximum intensity level falls within the range of 50% of the pupil diameter. However, the advantage that a suitable focus error can be obtained can also be achieved by adjusting the intensity distribution such that the maximum intensity level of the main beam falls within the range of 70% of the pupil diameter. However, to generate a suitable focus error signal while securing a sufficient light amount and a necessary beam spot, the intensity distribution may be adjusted such that the point of the maximum intensity level of the main beam falls outside the range of 20% of the pupil diameter.

In the above mentioned embodiment, both of the beam entering the optical disc D through the objective lens 10 and the beam retuning from the optical disc D to the photoreceptor 4 have the intensity distribution indicated by the curve of the solid line shown in FIG. 3. However, the intensity distribution of the beam returning from the optical disc D may not be adjusted to have the intensity distribution shown in FIG. 3. For example, the intensity distribution of the beam returning from the optical disc D may have Gaussian distribution.

In the above mentioned embodiment, the focus error signal is generated through use of the main beam and sub-beams. However, the focus error signal may be generated through use of one or two of the sub-beams.

In the above mentioned embodiment, the optical disc drive 100 is configured to generate two sub-beams. However, more than two sub-beams may be generated and used for the generation of the focus error signal.

This application claims priority of Japanese Patent Application No. P2006-107096, filed oil Apr. 10, 2006. The entire subject matter of the application is incorporated herein by reference.

What is claimed is:

1. An optical disc drive, comprising:
   a light source that emits a light beam;
   a beam dividing element that divides the light beam emitted by the light source into a main beam and a plurality of sub-beams such that each of the plurality of sub-beams has a light amount smaller than that of the main beam;
   an objective lens that converges each of the main beam and the plurality of sub-beams onto a recording surface of an optical disc;
   an astigmatism producer that gives astigmatism to each of the main beam and the plurality of sub-beams which passed through the objective lens after reflecting from the recording surface of the optical disc;
   a signal generator that has sensors respectively provided for receiving the main beam and at least two of the plurality of sub-beams which passed through the astigmatism producer, each of the sensors comprising four sensor segments, the signal generator processing output signals of the sensors in accordance with a differential astigmatic method to generate a focus error signal;
   an optical element that adjusts, without blocking transmission of a central portion of the main beam, an intensity distribution of the main beam by causing a maximum light amount of the main beam to be positioned away from a pupil center of the main beam, a radial distance between the position of the maximum light amount of the main beam and the pupil center to be within 70% of a pupil diameter of the main beam, and an intensity of the main beam to gradually decrease from the position of the maximum light amount to a periphery of the main beam,
   wherein the main beam and each of the sub-beams are incident on the optical element, and
   the optical element comprises a diffraction structure that provides a predetermined intensity distribution to an incident beam, and is provided on a surface of the objective lens.

2. The optical disc drive according to claim 1, wherein the radial distance between the position of the maximum light amount of the main beam and the pupil center is within 50% of the pupil diameter of the main beam.

3. The optical disc drive according to claim 1, wherein the radial distance between the position of the maximum light amount of the main beam and the pupil center is greater than 20% of the pupil diameter of the main beam.

4. The optical disc drive according to claim 1, wherein the main beam has an intensity distribution equal to a Gaussian distribution after being reflected from the recording surface of the optical disc.

5. The optical disc drive according to claim 1, wherein:
   each of the sensors has four sensor segments, and
   the signal generator generates the focus error signal in accordance with an astigmatic method.

6. The optical disc drive according to claim 1, wherein the signal generator generates an RF signal based on an output signal of a sensor for the main beam.

7. The optical disc drive according to claim 1, wherein the signal generator generates the focus error signal based on output signals of at least two of the sensors provided for the plurality of sub-beams.

8. The optical disc drive according to claim 7, wherein the signal generator generates the focus error signal further based on an output signal of a sensor for the main beam.

9. The optical disc drive according to claim 1, wherein the signal generator generates the focus error signal based on output signals of at least two of the sensors for the main beam and the plurality of sub-beams.

10. The optical disc drive according to claim 1, wherein the optical element adjusts an intensity distribution of each of the sub-beams so that the main beam and the sub-beams all have the same intensity distribution.

11. The optical disc drive according to claim 1, wherein the signal generator processes the output signals of the sensors in accordance with the differential astigmatic method to generate the focus error signal by receiving a first diagonal sum signal and a second diagonal sum signal from each of the sensors, combining the first diagonal sum signals to generate a combined first diagonal sum signal, combining the second diagonal sum signals to generate a combined second diagonal sum signal, and generating the focus error signal by calculating a difference between the combined first diagonal sum signal and the combined second diagonal sum signal.

12. The optical disc drive according to claim 11, wherein the first diagonal sum signal of each sensor is a sum of an output level of a first sensor segment and an output level of a second sensor segment arranged diagonal to the first sensor segment, and the second diagonal sum signal of each sensor is a sum of an output level of a third sensor segment and an output level of a fourth sensor segment arranged diagonal to the third sensor segment.

13. The optical disc drive according to claim 1, wherein the adjusted intensity distribution of the main beam gradually decreases from the maximum level to each of the periphery and pupil center.

14. The optical disc drive according to claim 1, the adjustment of the intensity distribution of main beam being structured to decrease noise generated due to focus error signal resulting from a portion of the main beam being incident onto a sensor of a sub-beam.

15. The optical disc drive according to claim 1, wherein maximum light amount of main beam is positioned away from pupil center by adjusting a diffraction efficiency of a diffraction structure on a surface of the objective lens.

16. An optical disc drive, comprising:
a light source that emits a light beam;
a beam dividing element that divides the light beam emitted by the light source into a main beam and a plurality of sub-beams such that each of the plurality of sub-beams has a light amount smaller than that of the main beam;
an objective lens that converges each of the main beam and the plurality of sub-beams onto a recording surface of an optical disc;
an astigmatism producer that gives astigmatism to each of the main beam and the plurality of sub-beams which passed through the objective lens after reflecting from the recording surface of the optical disc;
a signal generator that has sensors respectively provided for receiving the main beam and at least two of the plurality of sub-beams which passed through the astigmatism producer, each of the sensors comprising four sensor segments, the signal generator processing output signals of the sensors in accordance with a differential astigmatic method to generate a focus error signal;
an optical element that adjusts an intensity distribution of the main beam by causing, without blocking transmission of a central portion of the main beam a maximum light amount of the main beam to be positioned away from a pupil center of the main beam, a radial distance between the position of the maximum light amount of the main beam and the pupil center to be within 70% of a pupil diameter of the main beam, and an intensity of the main beam to gradually decrease from the position of the maximum light amount to a periphery of the main beam,
wherein the main beam and each of the sub-beams are incident on the optical element, and
the optical element comprises a coating that provides a predetermined intensity distribution to an incident beam, and is provided on a surface of the objective lens.

17. The optical disc drive according to claim 16, wherein the signal generator processes the output signals of the sensors in accordance with the differential astigmatic method to generate the focus error signal by receiving a first diagonal sum signal and a second diagonal sum signal from each of the sensors, combining the first diagonal sum signals to generate a combined first diagonal sum signal, combining the second diagonal sum signals to generate a combined second diagonal sum signal, and generating the focus error signal by calculating a difference between the combined first diagonal sum signal and the combined second diagonal sum signal.

18. The optical disc drive according to claim 17, wherein the first diagonal sum signal of each sensor is a sum of an output level of a first sensor segment and an output level of a second sensor segment arranged diagonal to the first sensor segment, and the second diagonal sum signal of each sensor is a sum of an output level of a third sensor segment and an output level of a fourth sensor segment arranged diagonal to the third sensor segment.

19. The optical disc drive according to claim 16, wherein the adjusted intensity distribution of the main beam gradually decreases from the maximum level to each of the periphery and pupil center.

20. The optical disc drive according to claim 16, the adjustment of the intensity distribution of main beam being structured to decrease noise generated due to focus error signal resulting from a portion of the main beam being incident onto a sensor of a sub-beam.

* * * * *